United States Patent
Yamazaki et al.

(10) Patent No.: US 11,482,754 B2
(45) Date of Patent: Oct. 25, 2022

(54) BATTERY MODULE AND BATTERY MODULE MANUFACTURING METHOD

(71) Applicant: TOYOTA JIDOSHA KABUSHIKI KAISHA, Toyota (JP)

(72) Inventors: Nobuyuki Yamazaki, Okazaki (JP); Koji Oshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 17/019,046

(22) Filed: Sep. 11, 2020

(65) Prior Publication Data

US 2021/0083245 A1 Mar. 18, 2021

(30) Foreign Application Priority Data

Sep. 12, 2019 (JP) .............................. JP2019-166346

(51) Int. Cl.
| | |
|---|---|
| *H01M 50/242* | (2021.01) |
| *H01M 50/20* | (2021.01) |
| *H01M 50/291* | (2021.01) |
| *H01M 50/293* | (2021.01) |
| *H01M 50/209* | (2021.01) |

(52) U.S. Cl.
CPC ......... *H01M 50/242* (2021.01); *H01M 50/20* (2021.01); *H01M 50/209* (2021.01); *H01M 50/291* (2021.01); *H01M 50/293* (2021.01)

(58) Field of Classification Search
None
See application file for complete search history.

(56) References Cited

U.S. PATENT DOCUMENTS

| | | | |
|---|---|---|---|
| 2009/0239137 A1 * | 9/2009 | Kakuchi | H01M 50/463 429/151 |
| 2016/0093849 A1 | 3/2016 | Dekeuster et al. | |
| 2018/0358587 A1 * | 12/2018 | Tononishi | H01G 11/10 |
| 2021/0273286 A1 | 9/2021 | Yamazaki | |
| 2021/0273287 A1 | 9/2021 | Mizutani | |

FOREIGN PATENT DOCUMENTS

| | | | |
|---|---|---|---|
| JP | 2017188282 A | * | 10/2017 |
| JP | 2018-032519 A | | 3/2018 |
| JP | 2018049803 A | * | 3/2018 |
| JP | 2018185949 A | * | 11/2018 |

OTHER PUBLICATIONS www.espacenet.com machine translation of the detailed description of JP 2017-188282A (Year: 2017).*
U.S. Office Action issued in U.S. Appl. No. 17/151,728 dated Jun. 28, 2022.

* cited by examiner

Primary Examiner — Gregg Cantelmo
(74) Attorney, Agent, or Firm — Oblon, McClelland, Maier & Neustadt, L.L.P.

(57) ABSTRACT

A battery module, including: a housing case having a box-shaped and an open top; a battery stack including a stacked battery body in which plural battery cells are stacked along a horizontal direction, the battery stack being housed in the housing case; and a spacer member disposed between the battery stack and the housing case in a state in which the battery stack is pressed in a stacking direction of the plural battery cells, the spacer member being formed with an elongated cutout portion that extends from a lower end of the spacer member towards an upper side of the spacer member.

7 Claims, 11 Drawing Sheets

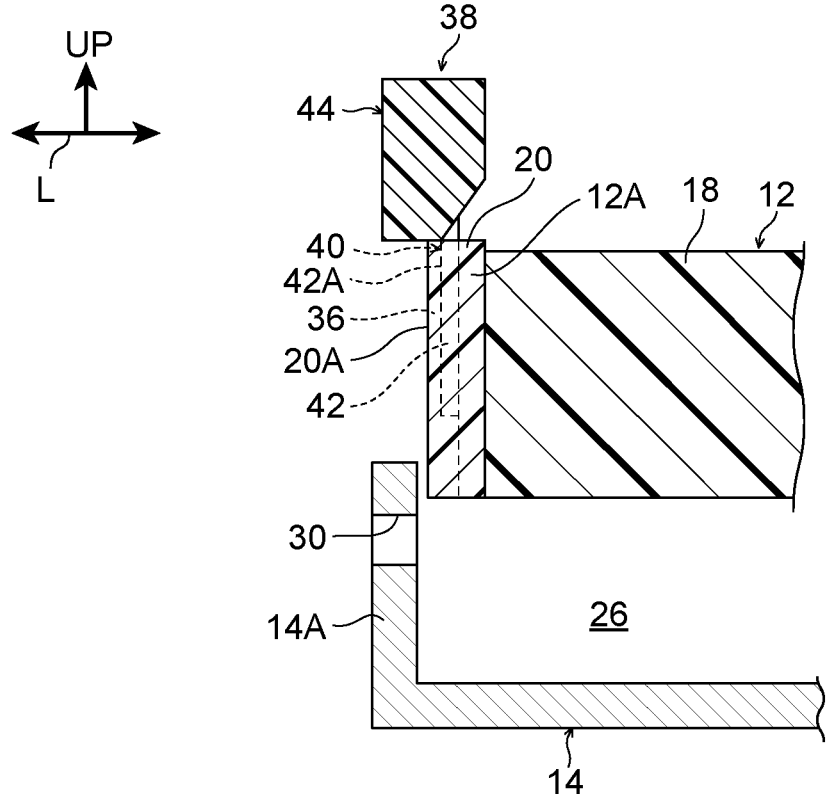
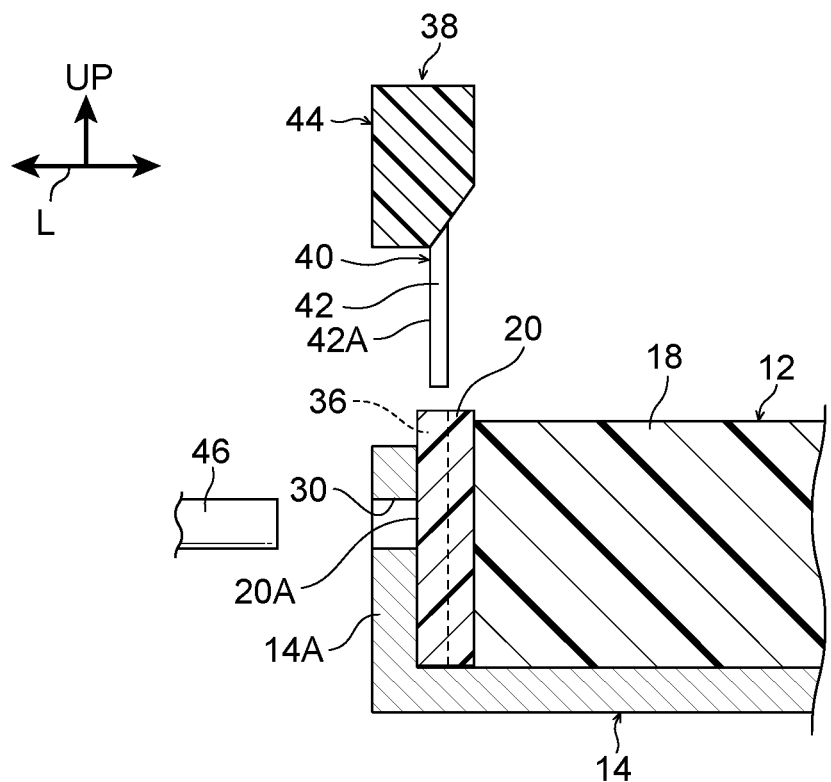

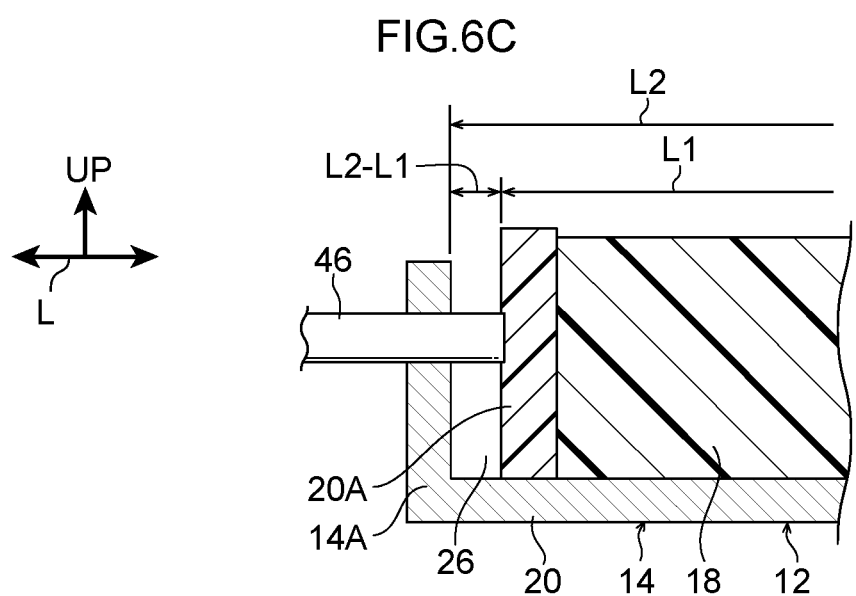

BATTERY MODULE AND BATTERY MODULE MANUFACTURING METHOD

CROSS-REFERENCE TO RELATED APPLICATION

This application claims priority under 35 USC 119 from Japanese Patent Application No. 2019-166346, filed on Sep. 12, 2019, the disclosure of which is incorporated by reference herein.

BACKGROUND

Technical Field

The present disclosure relates to a battery module and a battery module manufacturing method.

Related Art

Japanese Patent Application Laid-Open (JP-A) No. 2018-032519, discloses a battery module including a box-shaped module case having an open top and a battery stack housed in the module case. Further, the stack-side facing surface and the case-side facing surface that face each other between the battery stack and the module case are inclined at substantially the same angle. In the above disclosure, a restraining load is applied to the battery stack by pushing the battery stack into the accommodation space of the module case.

However, according to the disclosure of JP-A No. 2018-032519, due to a restraining load, which is a pressing force applied to a battery stack by the battery stack being pushed into a housing portion of a housing case such as a module case, there is a possibility that pressure may vary due to the manufacturing error of the housing case or the battery stack.

SUMMARY

The present disclosure provides a battery module and a battery module manufacturing method that may suppress variations in a pressing force that presses a battery stack, even when a manufacturing error occurs in a housing case or a battery stack.

A first aspect of the present disclosure is a battery module including: a housing case having a box-shaped and an open top; a battery stack including a stacked battery body in which plural battery cells are stacked along a horizontal direction, the battery stack being housed in the housing case; and a spacer member disposed between the battery stack and the housing case in a state in which the battery stack is pressed in a stacking direction of the plural battery cells, the spacer member being formed with an elongated cutout portion that extends from a lower end of the spacer member towards an upper side of the spacer member.

The battery module according to the first aspect of the present disclosure includes a housing case, a battery stack, and a spacer member. The housing case is box-shaped with an open top. The battery stack includes a stacked battery body in which plural battery cells are stacked along a horizontal direction, and is housed in a housing case.

Further, in the first aspect of the present disclosure, the spacer member is disposed between the battery stack and the housing case in a state in which the battery stack is housed in the housing case. By this spacer member, the battery stack is pressed in the stacking direction of the battery cells.

As described above, in the first aspect of the present disclosure, the spacer member is disposed between the battery stack and the housing case in a state in which the battery stack is pressed in a stacking direction of the battery cells. For this reason, for example, the battery stack is pressed in the stacking direction of the battery cells by a pressing member that presses the battery stack, a gap is provided between the battery stack and the housing case, and the spacer member is disposed in the gap. By disposing the spacer member in the gap, the spacer member is sandwiched between the battery stack and the housing case, and the reaction force of the spacer member presses the battery stack in the stacking direction of the battery cells.

Further, in the first aspect of the present disclosure, the spacer member has a cutout portion that extends from a lower end of the spacer member towards an upper side of the spacer member. Therefore, according to the first aspect of the present disclosure, in a state in which the battery stack is pressed in the stacking direction of the battery cells by the pressing member, the pressing member is disposed in the cutout portion of the spacer member and it is possible to avoid interference between the spacer member and the pressing member. That is, according to the first aspect of the present disclosure, it is possible to insert the spacer member from above the pressing member in a state in which the pressing member is disposed between the battery stack and the housing case.

Further, according to the first aspect of the present disclosure, due to the spacer member being disposed between the battery stack and the housing case, even if a manufacturing error occurs between the battery stack and the housing case, it is possible to absorb the manufacturing error by the thickness of the spacer member, that is, by changing the thickness of the plate. Thus, according to the first aspect, the battery module of the present disclosure may suppress a variation in the pressing force that presses the battery stack, even if a manufacturing error occurs in the battery stack or the housing case.

Although there are two locations between the battery stack and the housing case along the stacking direction of the battery cells, the spacer member may be disposed at one location or at two locations.

A second aspect of the present disclosure, in the first aspect, may further include: an end plate provided at each end the stacking direction of the plural battery cells of the battery stack; and a groove portion formed at an outer surface of the end plate and extending in a vertical direction from an upper end of the end plate, wherein a depth of the groove portion may be set such that the outer surface of the end plate protrudes further towards a side wall of the housing case than an inner surface of the first pressing, in a state in which a first pressing member configured to press the battery stack in the stacking direction of the plural battery cells is inserted into the groove portion member.

In the battery module according to the second aspect of the present disclosure, an end plate is provided at each end, in the stacking direction of the battery cells of the battery stack. A groove portion is provided at the outer surface of the end plate, and the groove portion is formed along the vertical direction from the upper end of the end plate.

For this reason, in the second aspect of the present disclosure, the first pressing member is inserted into the groove portion from the upper end of the end plate, and is possible to press the battery stack in the stacking direction of the battery cells via the first pressing member. Further, in the second aspect of the present disclosure, the depth of the groove portion is set such that, in a state in which the first pressing member is inserted into the groove portion, the outer surface of the end plate protrudes further towards a side wall of the housing case than the inner surface of the first pressing member.

Therefore, in the second aspect of the present disclosure, the battery stack can be housed in the housing case in a state in which the first pressing member is inserted into the groove portion formed in the end plate of the battery stack. Further, according to the second aspect of the present disclosure, it is possible to remove the first pressing member from inside the groove portion without interfering with the housing case in a state in which the battery stack is housed in the housing case.

Here, "the groove portion is formed in a vertical direction from an upper end of the end plate" means that the groove portion may be formed from the upper end to the lower end of the end plate, or that the groove portion may be formed in a vertical direction from an upper end to a center portion of the end plate. Further, the groove portion may be formed at least from the upper end of the end plate.

In a third aspect of the present disclosure, in the second aspect, wherein the outer surface of the end plate may include a surface to be pressed, the surface to be pressed may be configured to be exposed through the elongated cutout portion of the spacer member and may deforms when the end plate is pressed in the stacking direction of the plural battery cells.

In the battery module according to the third aspect of the present disclosure, the outer surface of the end plate includes a surface to be pressed. The surface to be pressed is configured to be exposed through the cutout portion of the spacer member, and is set to deform when the end plates configuring both ends of the battery stack in the battery stacking direction of the battery cells is pressed in the battery cell stacking direction of the battery cells.

As a result, for example, when a pressing force that is equal to or greater than a preset predetermined value acts on the battery stack, the surface to be pressed of the end plate is set to deform. Therefore, the third aspect of the present disclosure may absorb excess pressing force and may prevent pressing force greater than the predetermined value from acting on the battery stack.

In a fourth aspect of the present disclosure, in the third aspect, a closing member, which closes a through hole formed opposite to the surface to be pressed, may be provided at the side wall of the housing case.

In the battery module according to the fourth aspect of the present disclosure, a closing portion is provided at the side wall of the housing case, and a through hole that is formed opposite to the surface to be pressed is closed by the closing portion.

In this manner, due to the through hole being formed in the side wall of the housing case, it is possible to insert a second pressing member through the through hole in a state in which the battery stack is housed in the housing case, and to press the battery stack in the stacking direction of the battery cells by the second pressing member. The second pressing member comes into contact with the surface to be pressed. After the second pressing member is removed from the side wall of the housing case, the through hole is closed by the closing portion in order to ensure waterproofness of the housing case.

A fifth aspect of the present disclosure is a battery module manufacturing method for manufacturing a battery module according to the above aspects, the method comprising: a battery stack housing step in which a first pressing member, which is configured to be inserted into a groove portion formed on an outer surface of an end plate provided at each end of a stacking direction of plural battery cells of a battery stack, is inserted into the groove portion, the battery stack is pressed in the stacking direction of the plural battery cells, and the battery stack is housed in a housing case; a battery stack pressing step in which a second pressing member, which is configured to press the battery stack in the stacking direction of the plural battery cells, is inserted into a through hole that is formed at a side wall of the housing case, the battery stack is pressed in the stacking direction of the plural battery cells by the second pressing member in a state in which the first pressing member has been removed from the end plate, and a gap is provided between the housing case and the battery stack; a spacer member insertion step in which a spacer member is inserted into the gap; and a spacer member fixing step in which the second pressing member is removed from the side wall of the housing case and the spacer member is fixed.

The battery module manufacturing method according to the fifth aspect of the present disclosure includes a battery stack housing step, a battery stack pressing step, a spacer member insertion step, and a spacer member fixing step.

In the battery stack housing step, a first pressing member, which is configured to be inserted into a groove portion that is formed at an outer surface of an end plate that is provided at each end, in a stacking direction of plural battery cells of a battery stack, is inserted into the groove portion, the battery stack is pressed in the stacking direction of the plural battery cells via the end plate, and the battery stack is housed in a housing case.

In the battery stack pressing step, a second pressing member, which is configured to press a battery stack in a stacking direction of plural of battery cells, is inserted into a through hole that is formed at a side wall of a housing case, the battery stack is pressed in the stacking direction of the plural battery cells by the second pressing member in a state in which the first pressing member has been removed from the end plate, and a gap is provided between the housing case and the battery stack.

In the spacer member insertion step, the spacer member is inserted into a gap provided between the housing case and the battery stack.

In the spacer member fixing step, the second pressure member is removed from the side wall of the housing case and the spacer member is fixed. Specifically, the battery stack is pressed in the stacking direction of the plural battery cells by inserting the spacer member into the gap provided between the housing case and the battery stack by the second pressing member. Therefore, when the second pressing member is removed from the side wall of the housing case, the spacer member is sandwiched and fixed between the housing case and the battery stack.

In a sixth aspect of the present disclosure, in the fifth aspect, a through hole closing step, in which the through hole is closed, may be provided after the spacer member fixing step.

In the battery module manufacturing method according to the sixth aspect of the present disclosure, a through hole closing step is provided after the spacer member fixing step, and in the through hole closing step, a through hole formed in the side wall of the housing case may be closed.

As described above, the battery module according to the first aspect may suppress variations in the pressing force that presses the battery stack even when a manufacturing error occurs in the housing case or the battery stack.

In the battery module according to the second aspect, the battery stack may be housed in the housing case in a state in which the first pressing member is inserted into the groove portion of the end plate, and the first pressing member can be removed from the groove portion.

The battery module according to the third aspect may prevent a pressing force greater than a predetermined value from acting on the battery stack.

In the battery module according to the fourth aspect, the battery stack may be pressed by inserting the second pressing member through the through hole formed in the side wall of the housing case.

The battery module manufacturing method according to the fifth aspect may suppress variations in the pressing force that presses the battery stack even when a manufacturing error occurs in the housing case or the battery stack.

In the battery module manufacturing method according to the sixth aspect, the waterproofness of the housing case may be ensured by closing the through hole.

BRIEF DESCRIPTION OF THE DRAWINGS

Exemplary embodiments will be described in detail based on the following figures, wherein:

FIG. 5A is a cross-sectional view along the A-A line of FIG. 2, illustrating a battery stack housing step when manufacturing the battery module according to the present exemplary embodiment;

FIG. 5B is a cross-sectional view corresponding to FIG. 5A, illustrating a battery stack housing process;

FIG. 6C is a cross-sectional view corresponding to FIG. 5A, illustrating a member measurement step;

DETAILED DESCRIPTION

A battery module 10 according to an exemplary embodiment of the present disclosure will be described with reference to the drawings. Note that arrow UP, arrow L, and arrow W illustrated in each of the drawings respectively indicate the upward direction, the longitudinal direction, and the width direction of the battery module 10 according to the exemplary embodiment.

First, the structure of the battery module 10 according to an exemplary embodiment of the present disclosure will be described.

Figure 1:
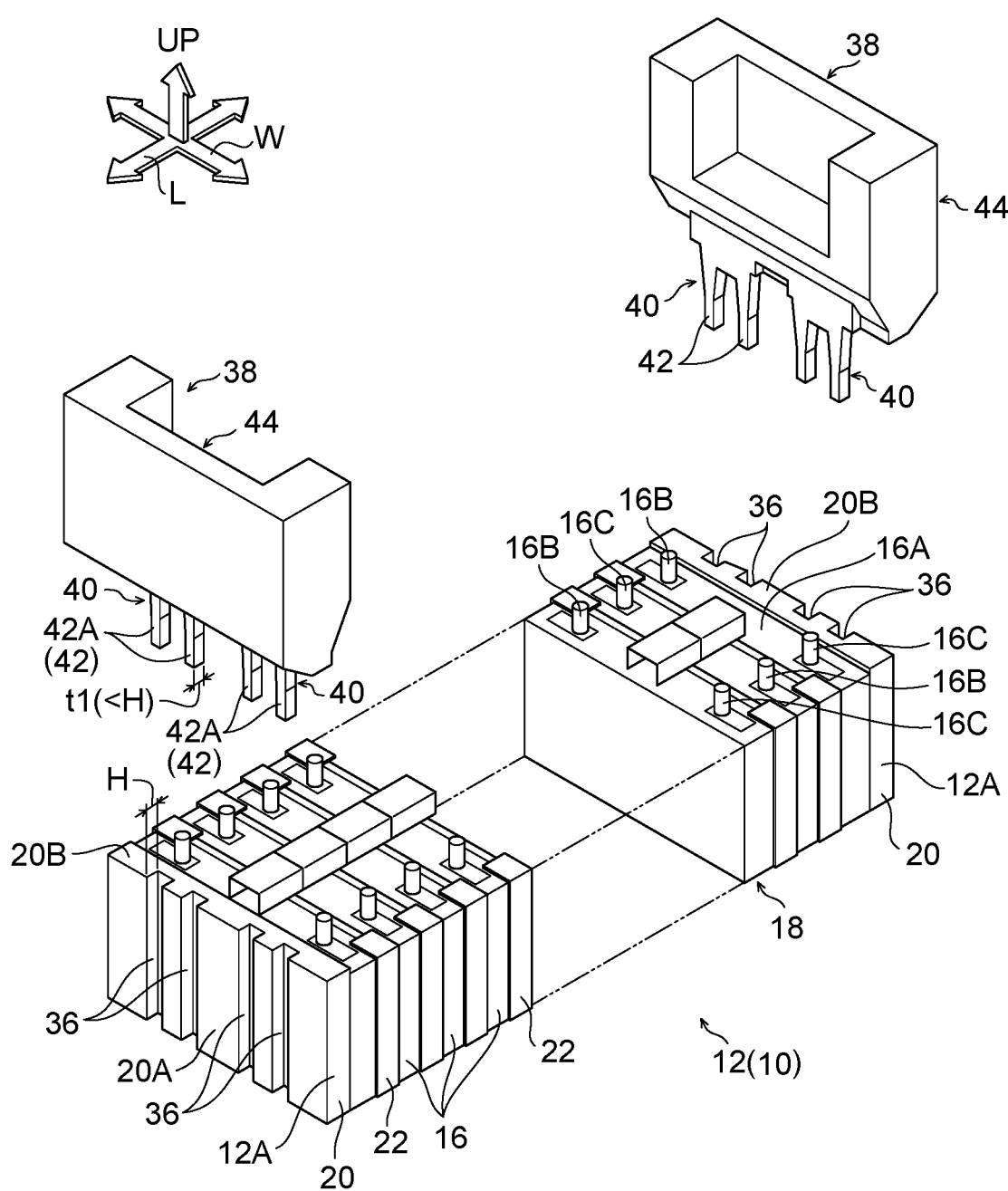
FIG. 1 is an exploded perspective view of a battery stack and a pressing member which constitute a part of a battery module according to the present exemplary embodiment, as viewed obliquely from the front side.
Figure 2:
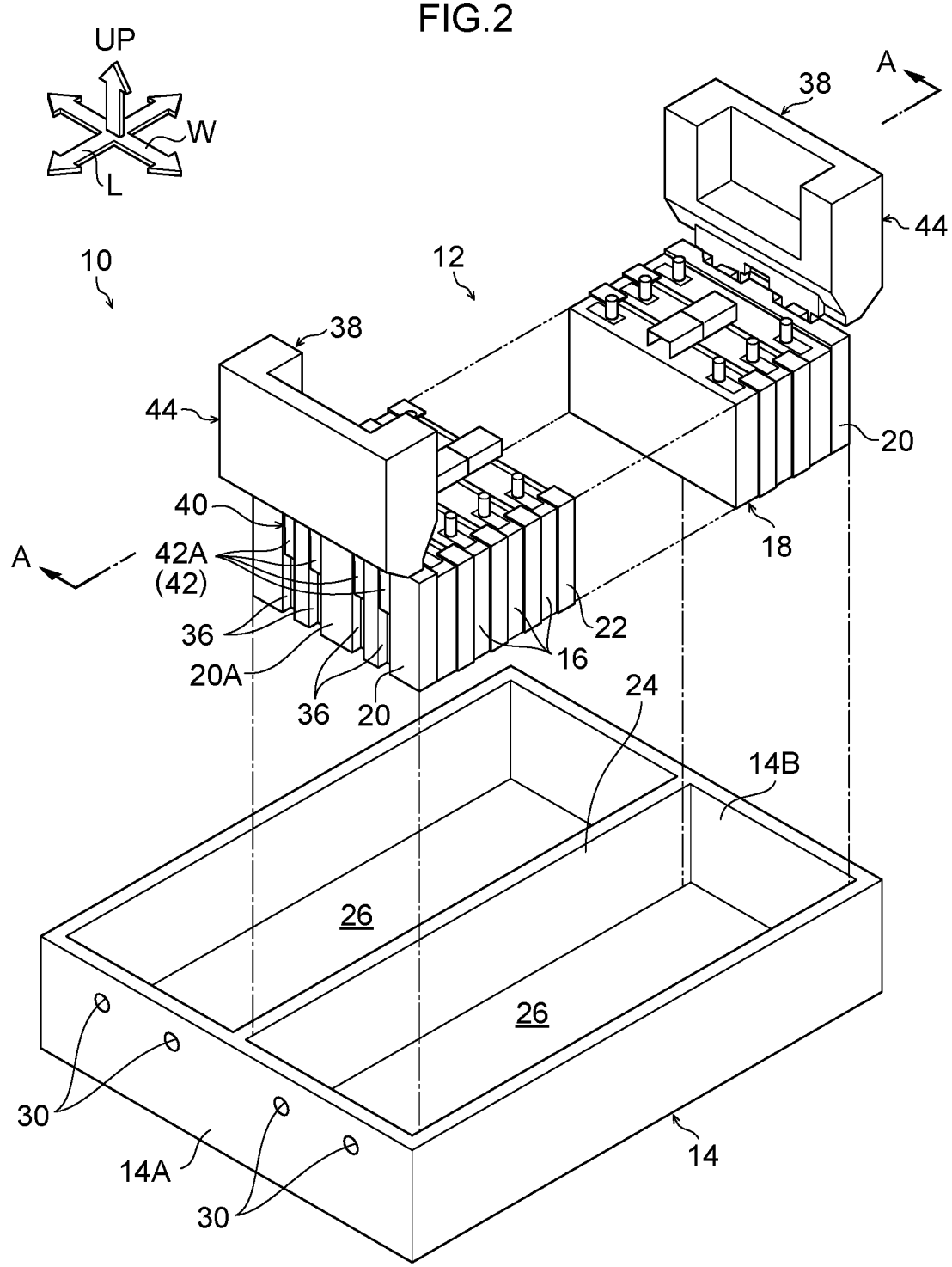
FIG. 2 is an exploded perspective view of a battery stack and a housing case which constitute the battery module according to the present exemplary embodiment, as viewed obliquely from the front side.

FIG. 1 is an exploded perspective view of a battery stack 12 constituting a part of the battery module 10, and a pressing member 38 for pressing the battery stack 12, as viewed obliquely from the front side. FIG. 2 is an exploded perspective view of the battery stack 12 and the housing case 14 which constitute the battery module 10, as viewed obliquely from the front side. The pressing member 38 corresponds to a first pressing member.

The battery module 10 illustrated in FIG. 2 includes a battery stack 12 made of resin and a storage case 14 made of metal. As illustrated in FIG. 1, the battery stack 12 includes a battery stack 18 in which a plurality of battery cells 16 are stacked in a horizontal direction. In the battery stack 12, resin end plates 20 are provided at both ends of a battery stack 18 along the stacking direction of the battery cells 16. The laminating direction is the direction of arrow L illustrated in FIG. 1.

Here, the battery stack 12 is formed in a substantially rectangular parallelepiped shape whose longitudinal direction is the stacking direction of the battery cells 16, and the end plate 20 has a substantially rectangular plate shape with the stacking direction being the plate thickness direction. Each battery cell 16 is, for example, a chargeable and dischargeable secondary battery, for example, a lithium ion secondary battery, and is a flat rectangular parallelepiped rectangular battery. It should be noted that the present invention is not limited to the lithium ion secondary battery, but may be another type such as a nickel hydrogen secondary battery.

Further, a cylindrical positive electrode terminal 16B and a cylindrical positive negative electrode terminal 16C are provided on the upper surface 16A of each battery cell 16. The battery cells 16 are arranged in different directions so that the positive electrode terminals 16B and the negative electrode terminals 16C are alternately arranged along the longitudinal direction of the battery stack 18. The longitudinal direction is the direction in which the battery cells 16 are stacked. The positive terminal 16B and the negative terminal 16C of the battery cells 16 adjacent to each other along the longitudinal direction of the battery stack 18 are connected to each other via a bus bar (not illustrated) that is a conductive member.

The battery stack 18 has a configuration in which the battery cells 16 and the resin frames 22 are alternately stacked. That is, in the battery stack 18, the resin frames 22 are provided between the battery cells 16 as the insulating members.

The resin frame 22 is formed of, for example, a resin such as polypropylene, and the battery cells 16 are arranged at both ends in the longitudinal direction of the battery stack 18. An end plate 20 made of a resin such as polypropylene is integrated with the battery cells 16 arranged at both ends in the longitudinal direction of the battery stack 18 by bonding or the like.

On the other hand, as illustrated in FIG. 2, the housing case 14 has a box shape with an open upper side, and is made of die-cast aluminum or the like. The battery stack 12 can be accommodated in the accommodation case 14.

In the present exemplary embodiment, a partition wall 24 is provided at the center in the width direction of the storage case 14, and the storage case 14 is partitioned into two by the partition wall 24. As a result, two accommodation portions 26 are provided, and the battery stack 12 can be accommodated in each of the two accommodation portions 26.

Here, the shape of the storage case 14 is simply illustrated, but actually, the storage case 14 is provided with a reinforcing rib or the like in order to improve the rigidity of the storage case 14 itself. Further, here, although two battery stacks 12 can be accommodated in one accommodation case 14, it may be set such that the capacity of the accommodation case is increased so that one battery stack is accommodated in one accommodation case.

In the present exemplary embodiment, the battery stack 12 and a shim 28 described later are housed in the housing portion 26 of the housing case 14 (see FIG. 3). Note that the shim 28 corresponds to a spacer member. In addition to these members, although not illustrated, a cooling member such as a cooling fan for cooling the battery cells 16 may be housed in the housing portion 26 of the housing case 14.

Figure 3:
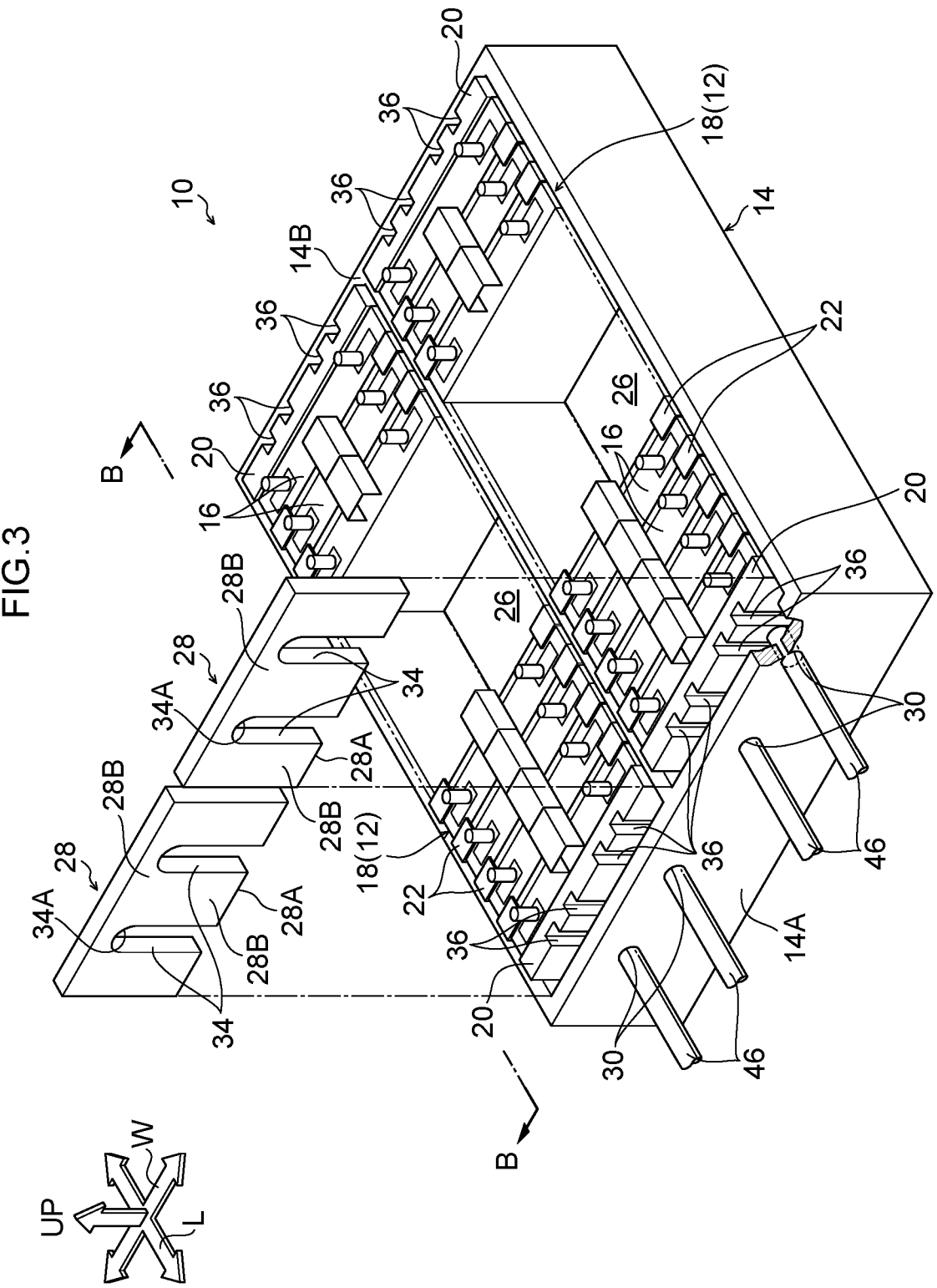
FIG. 3 is an exploded perspective view illustrating a battery stack of the battery module according to the present exemplary embodiment and a state in which a shim is inserted between the battery stack and the storage case, as viewed obliquely from the front side.

Here, FIG. 3 shows an exploded perspective view of a battery module 10, as viewed from an oblique front side, in which the battery stack 12 is housed in the housing portion 26 of the housing case 14 and the shim 28 is inserted between the battery stack 12 and the housing case 14. Further, FIG. 4 shows an exploded perspective view of a battery module 10, as viewed from an oblique front side, in which the battery stack 12 is accommodated in the accommodating portion 26 of the accommodating case 14 and the shim 28 is inserted between the battery stack 12 and the accommodating case 14.

Figure 4:
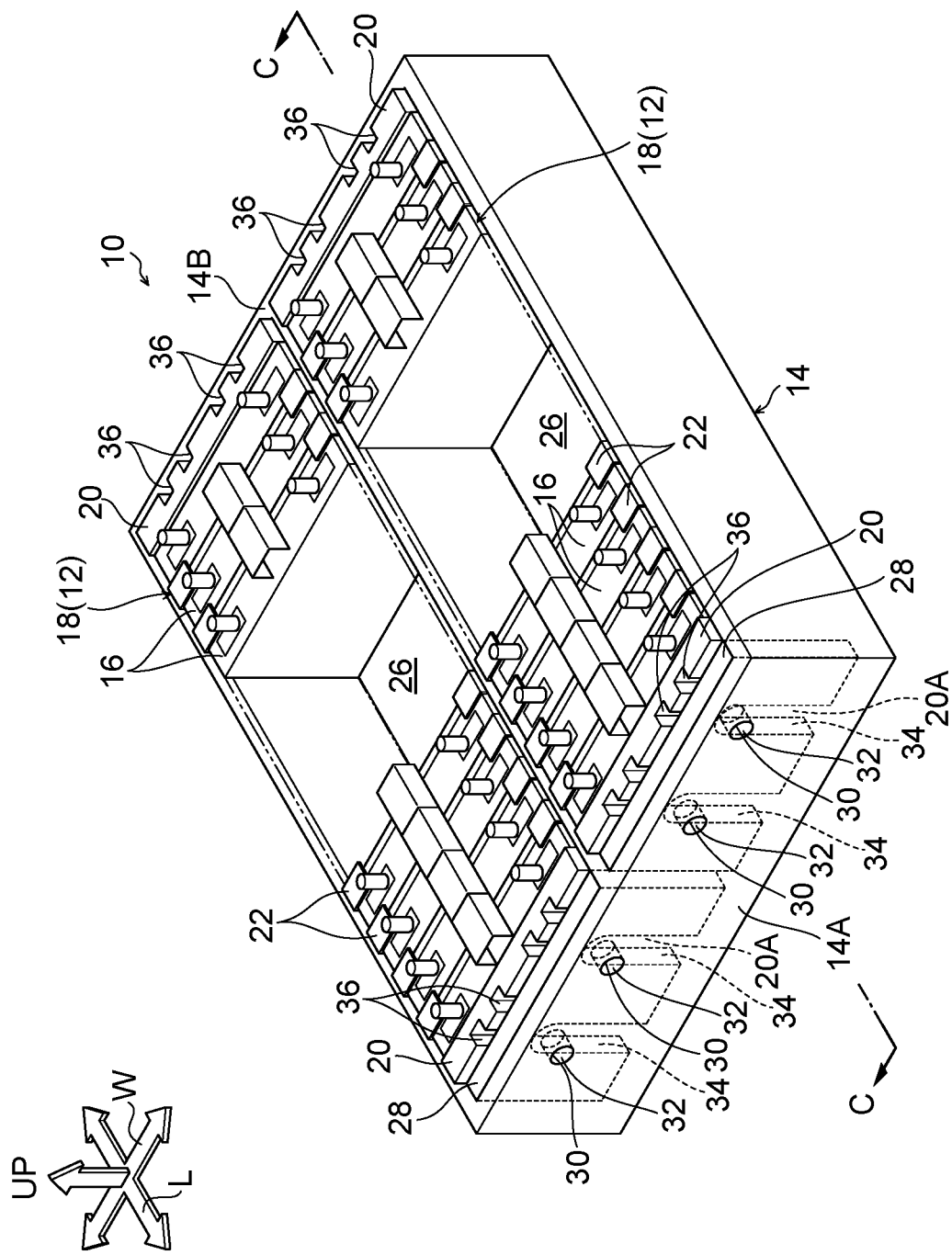
FIG. 4 is a perspective view of the battery module according to the present exemplary embodiment, as viewed obliquely from the front side.

As illustrated in FIG. 4, in the present exemplary embodiment, in the housing case 14, a closing portion 32 in which the plurality of through holes 30 formed along the substantially horizontal direction are closed is provided at the upper part of one of the two side walls 14A and 14B. The two side walls 14A and 14B face end plates 20 provided at both ends of the battery stack 12 along the direction in which the battery cells 16 are stacked.

In the present exemplary embodiment, two closing portions 32 are provided in the two housing portions 26 along a substantially horizontal direction. The closing portion 32 is configured to close the through hole 30 in a through hole closing step in a battery module manufacturing method described later. In other words, the through-hole 30 is in a formed state before the through-hole closing step. For this reason, in the following description, the through-hole 30 may be mentioned as an object of description for convenience.

Meanwhile, in the present exemplary embodiment, as illustrated in FIGS. 3 and 4, a shim 28 can be arranged between the battery stack 12 and the side wall 14A of the housing case 14 along the stacking direction of the battery cells 16. The shim 28 is a plate material made of metal, for example, stainless steel, and cutout portion 34 that is cut out in an elongated hole shape from lower end 28A of the shim 28 upwards and forms an arc-like upper edge 34A, is provide at the shim 28.

For this reason, in a state where the battery stack 12 and the shim 28 are housed in the housing portion 26 of the housing case 14, the outer surface 20A of the end plate 20 of the battery stack 12 passes through the through hole 30 and the notch 34 of the shim 28 and can be exposed. The outer surface of the end plate 20 of the battery stack 12 is a surface to be pressed. Note that the notch portions 34 are provided at two locations along the width direction of the battery stack 12 which is substantially orthogonal to the longitudinal direction of the battery stack 12. The longitudinal direction of the battery stack 12 is the direction of the arrow L, and the width direction of the battery stack 12 perpendicular thereto is the direction of the arrow W.

The width of the notch 34 of the shim 28 is set to be slightly larger than the inner diameter of the through hole 30. Further, the position of the upper edge 34A of the notch 34 in the vertical direction is set to be substantially the same as the upper edge 30A of the through hole 30 provided in the side wall 14A of the storage case 14 in a state where the shim 28 is stored in the storage 26 of the storage case 14 (see FIG. 8B). The vertical direction is a height direction.

Regarding the position of the upper edge 34A of the notch portion 34 in the height direction, when viewing the battery stack 12 from the through hole 30 side of the storage case 14 in a state where the battery stack 12 is stored in the storage portion 26 of the storage case 14, it is only necessary that the upper portion 28B of the shim 28 does not block the through hole 30. For this reason, the position in the height direction of the upper edge 34A of the notch 34 may be provided above the through hole 30.

On the other hand, as illustrated in FIG. 1, grooves 36 (here, four grooves) are provided on the outer surface 20A of the end plate 20 along the vertical direction from the upper end 20B of the end plate 20. As illustrated in FIG. 4, when viewing the battery stack 12 from the through hole 30 side of the storage case 14 in a state where the battery stack 12 is stored in the storage portion 26 of the storage case 14, the grooves are formed at a position that does not overlap with the through hole 30.

Meanwhile, in the present exemplary embodiment, as illustrated in FIG. 1, a pair of pressing members 38 that press the battery stack 12 along the longitudinal direction are used. The longitudinal direction of the battery stack 12 is the direction of the arrow L in FIG. 1, that is, the direction in which the battery cells 16 are stacked. The pressing member 38 includes a pressing portion 44 formed in a substantially rectangular parallelepiped shape in accordance with the dimension of the battery stack 12 in the width direction, and a claw portion 40 hanging down from a lower portion of the pressing portion 44. The claw portion 40 is provided with two leg pieces 42 along the width direction of the battery stack 12. Note that the width direction of the battery stack 12 is the direction of the arrow W in FIG. 1.

The pressing members 38 can be disposed above the end plates 20 provided on the battery stack 12, respectively, and can be moved in directions approaching each other along the longitudinal direction of the battery stack 12. The leg pieces 42 provided on the pressing member 38 can be inserted into the grooves 36 formed on the end plate 20 of the battery stack 12.

For this reason, by the pressing members 38 approaching each other with the leg pieces 42 inserted into the groove portions 36, the battery stack 12 is pressed through the leg pieces 42 in the stacking direction of the battery cells 16 and compressed.

Further, in the present exemplary embodiment, the depth H of the groove 36 formed in the end plate 20 is set to be larger than the thickness t1 of the leg 42. Therefore, the outer surface 20A of the end plate 20 projects outward from the outer surface 42A of the leg 42 in a state where the leg 42 is inserted into the groove 36 of the end plate 20.

Next, the operation of the battery module 10 according to the exemplary embodiment of the present disclosure will be described together with the description of the manufacturing process of manufacturing the battery module 10.

The battery module 10 according to the present exemplary embodiment is manufactured through a battery stack housing process, a battery stack pressurizing process, a member measuring process, a shim inserting process, a shim fixing process, and a through-hole closing process, in this order.

Figure 7A:
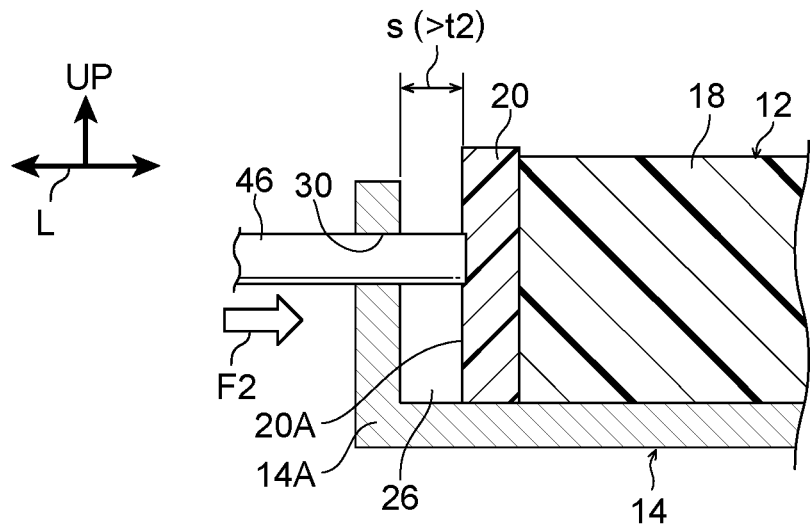
FIG. 7A is a cross-sectional view corresponding to FIG. 5A, illustrating a spacer member inserting step when manufacturing the battery module according to the present exemplary embodiment.
Figure 7B:
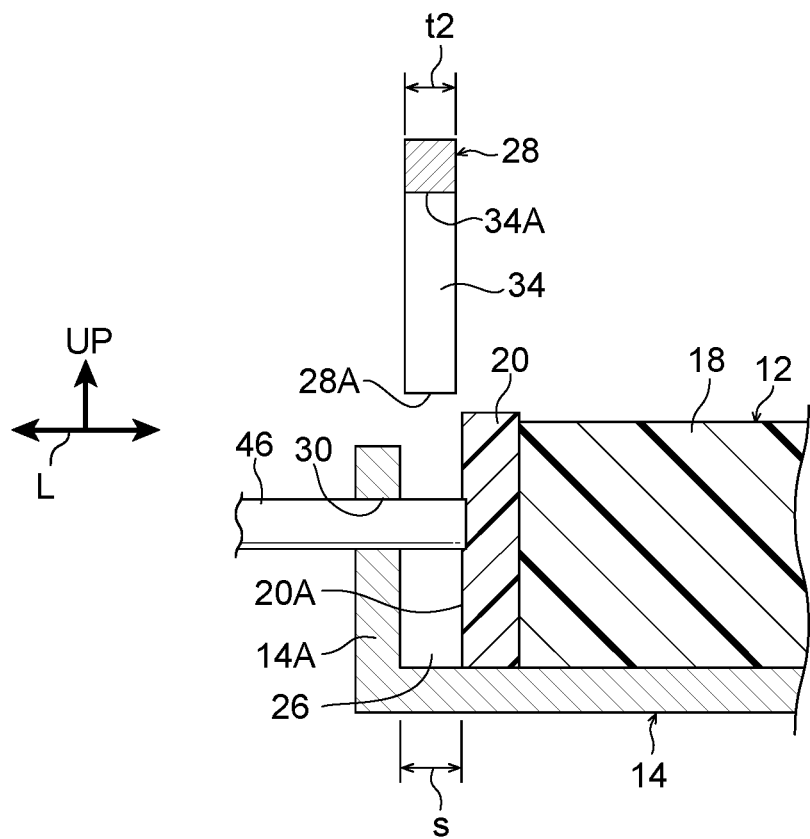
FIG. 7B is a sectional view along the B-B line of FIG. 3, illustrating a spacer member inserting step.
Figure 8A:
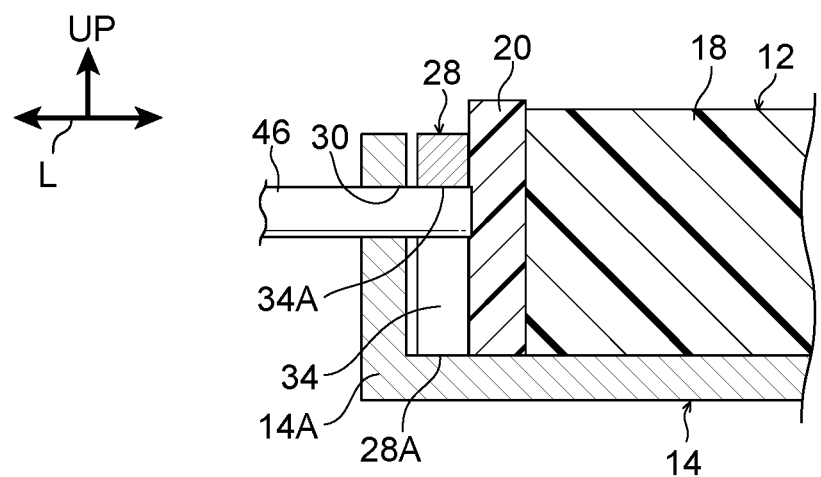
FIG. 8A is a cross-sectional view corresponding to FIG. 7B, illustrating a spacer member inserting step when manufacturing the battery module according to the present exemplary embodiment.
Figure 8B:
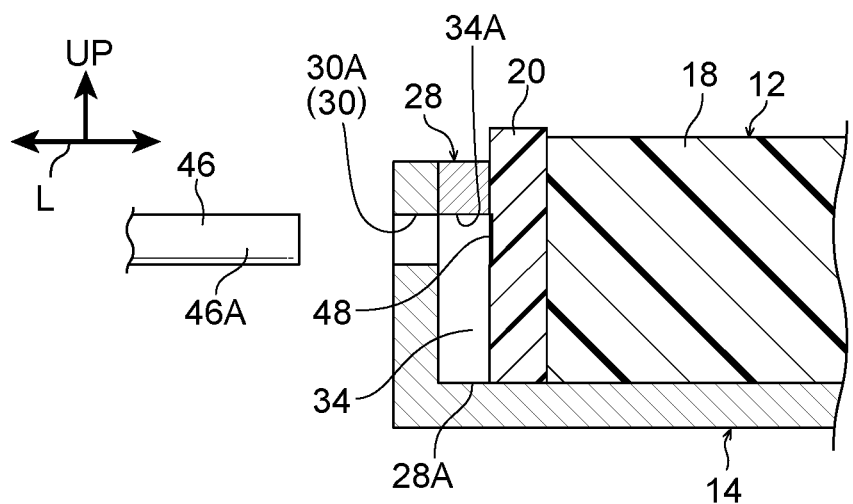
FIG. 8B is a cross-sectional view corresponding to FIG. 7B, illustrating a spacer member fixing step.
Figure 9:
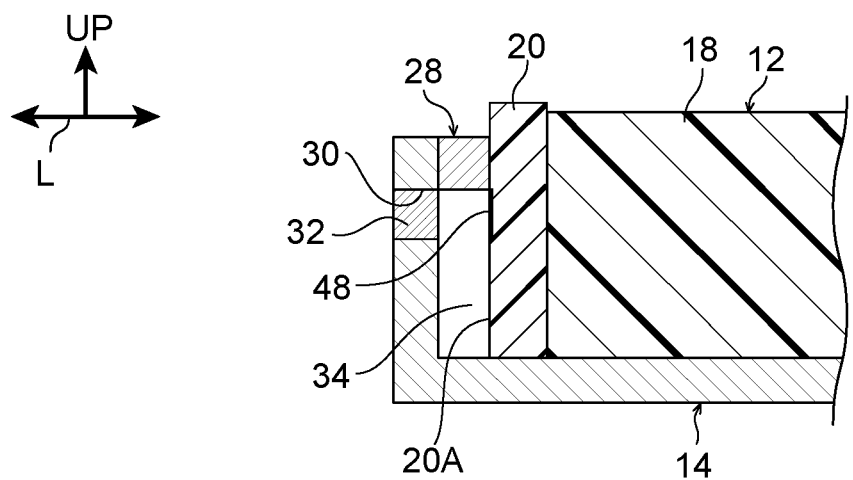
FIG. 9 is a cross-sectional view along the C-C line of FIG. 4, illustrating a through-hole closing step when manufacturing the battery module according to the present exemplary embodiment.
Figure 10:
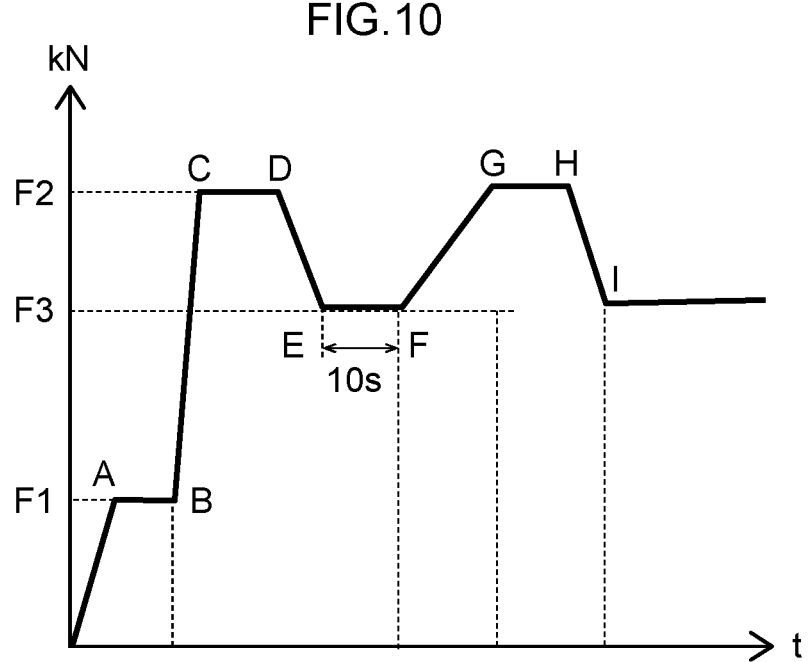
FIG. 10 is a graph illustrating a relationship between a manufacturing process of the battery module according to the present exemplary embodiment and a pressing force.

Here, FIGS. 5A and 5B to 9 are cross-sectional views for explaining each process, and FIG. 10 is a graph illustrating a relationship between a manufacturing process (time) of the battery module 10 and a pressing force. FIGS. 5A and 5B show a battery stack housing process, FIGS. 6A and 6B show a battery stack pressurizing process, and FIG. 6C shows a member measuring process. FIGS. 7A, 7B, and 8A show a shim insertion step, and FIG. 8B shows a shim fixing step. FIG. 9 shows a through-hole closing step.

First, in the battery stack accommodating step in the present exemplary embodiment, as illustrated in FIG. 2 and FIG. 5A, the leg pieces 42 of the plurality of claw portions 40 provided on the pressing member 38 are respectively inserted into the plurality of groove portions 36 formed at the outer surface 20A of the end plate 20 provided at both end portions 12A in the longitudinal direction of the battery stack 12.

Then, the pressing members 38 are brought close to each other, and the battery stack 12 is pressed through the leg 42 of the claw portion 40 of the pressing member 38 along the stacking direction of the battery cells 16 at a predetermined pressing force F1 (See FIG. 10) (point A; see FIG. 10). Thereby, the battery stack 12 is compressed along the stacking direction of the battery cells 16, and in this state, the battery stack 12 is housed in the housing portion 26 of the housing case 14 (point B; see FIG. 10).

Here, in the present exemplary embodiment, as illustrated in FIG. 1, the depth H of the groove 36 of the end plate 20 is set to be larger than the thickness t1 of the leg 42 of the pressing member 38 (T1<H). For this reason, in the present exemplary embodiment, as illustrated in FIG. 5A, with the leg pieces 42 of the pressing member 38 being inserted into the groove portions 36 of the end plate 20, the outer surface 20A of the end plate 20 is set to protrude outward from the outer surface 42A of the leg 42.

That is, in the present exemplary embodiment, the outer surface 42A of the leg 42 does not protrude from the outer surface 20A of the end plate 20 in a state where the leg 42 of the pressing member 38 is inserted into the groove 36 of the end plate 20.

Therefore, in the present exemplary embodiment, the battery stack 12 can be housed in the housing case 14 with the leg pieces 42 of the pressing member 38 inserted into the grooves 36 of the end plate 20. Further, in the present exemplary embodiment, in a state where the battery stack 12 is housed in the housing case 14, as illustrated in FIG. 5B, the leg pieces 42 of the pressing member 38 can be retracted from inside the groove 36 without interfering with the housing case 14.

Figure 6A:
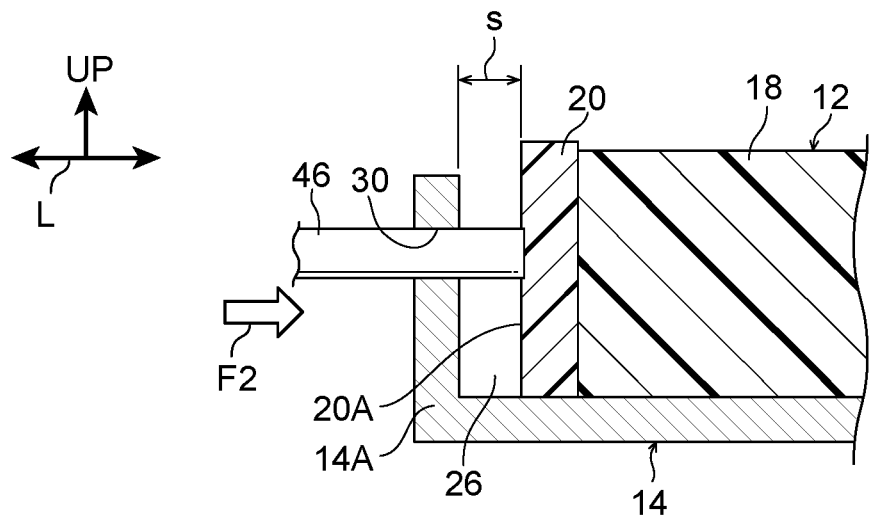
FIG. 6A is a cross-sectional view corresponding to FIG. 5A, illustrating a battery stack pressurizing step when manufacturing the battery module according to the present exemplary embodiment.

Next, in the battery stack pressurizing step in the present exemplary embodiment, as illustrated in FIGS. 3 and 6A, with the leg 42 of the pressurizing member 38 retracted from the end plate 20 of the battery stack 12, the pressure rod 46 is inserted into the through hole 30 formed in the side wall 14A of the housing case 14. Here, the pressing rod 46 is formed of, for example, a metal having a columnar shape. The pressing member 46 corresponds to a second pressing member.

In the exemplary embodiment, as described above, after the leg 42 of the pressing member 38 is retracted from the end plate 20 of the battery stack 12, the pressing rod 46 is inserted into the through hole 30 of the storage case 14. However, the leg 42 of the pressure member 38 may be retracted from the end plate 20 of the battery stack 12 after the pressure rod 46 is inserted into the through hole 30 of the storage case 14.

Further, in the present exemplary embodiment, the pressing rod 46 is brought into contact with the outer surface 20A of the end plate 20 of the battery stack 12, and the battery stack 12 is pressed along the stacking direction of the battery cells 16, via the pressing rod 46, at a predetermined pressure F2 (F2>F1; see FIG. 10) (point C; see FIG. 10) to provide a gap s (see FIG. 6A) between the housing case 14 and the battery stack 12 (point D) (See FIG. 10).

Figure 6B:
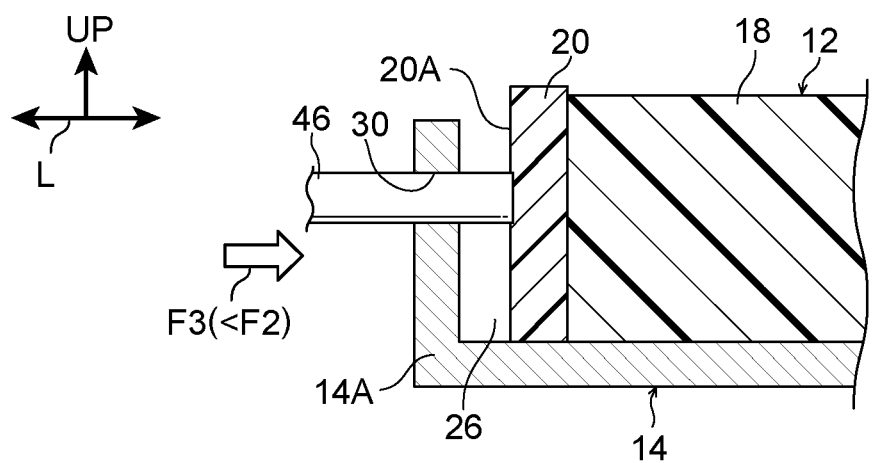
FIG. 6B is a cross-sectional view corresponding to FIG. 5A, illustrating a battery stack pressurizing step when manufacturing the battery module according to the present exemplary embodiment.

Next, in the present exemplary embodiment, as illustrated in FIGS. 6A and 6B, the pressing force F2 by the pressing rod 46 is reduced to the pressing force F3 (F1<F3<F2; see FIG. 10) (point E; See FIG. 10). The pressing force of F3 is a pressure required for the battery stack 18 in the battery module 10 at the time of production.

Next, in the member measuring step in the present exemplary embodiment, in the battery stack pressurizing step, the battery stack 12 is pressurized with the pressing force F3 (see FIG. 10) along the stacking direction of the battery cells 16, and after a predetermined time (about 10 s) has elapsed (point F; see FIG. 10), the length (L1) of the battery stack 12 in the longitudinal direction is measured as illustrated in FIG. 6C. Here, the predetermined time is set to about 10 s, but the time set according to the material, capacity, and the like of the battery stack 12 can be changed.

Further, in the present exemplary embodiment, the length (L2) of the storage portion 26 of the storage case 14 in the longitudinal direction is measured. Then, the shim 28 (see FIG. 7B) is selected by the dimensional difference (L2−L1) between the length (L2) of the housing portion 26 in the housing case 14 in the longitudinal direction and the length (L1) of the battery stack 12 in the longitudinal direction. That is, the shim 28 having the same plate thickness as the dimensional difference or a slightly larger plate thickness (t2) than the dimensional difference is selected.

Next, in the shim inserting step in the present exemplary embodiment, as illustrated in FIGS. 3 and 7A, first, the battery stack 12 is pressed once more through the pressing rod 46 along the stacking direction of the battery cells 16 with the pressing force F2 (point G; see FIG. 10) to secure a gap s (>t2) for inserting the shim 28 between the storage case 14 and the battery stack 12.

Next, in the present exemplary embodiment, as illustrated in FIGS. 3 and 7B, the shim 28 is inserted into the gap s provided between the housing case 14 and the battery stack 12 (point H; see FIG. 10).

Here, in the present exemplary embodiment, the shim 28 is formed with a cutout portion 34 cut out in a long hole shape from the lower end 28A of the shim 28 toward the upper side. As described above, the width of the notch 34 is set to be slightly larger than the inner diameter of the through hole 30 provided in the side wall 14A of the storage case 14. Therefore, the width of the notch 34 is slightly larger than the outer diameter of the pressure rod 46.

For this reason, in the present exemplary embodiment, interference with the pressing rod 46 can be avoided by the notch 34 of the shim 28 in a state where the pressing rod 46 is inserted into the through hole 30 formed in the side wall 14A of the housing case 14. That is, in the present exemplary embodiment, the shim 28 can be inserted into the gap s provided between the storage case 14 and the battery stack 12 without interfering with the pressing rod 46.

As a comparative example, although not illustrated, for example, the gap d for inserting the shim 28 between the housing case 14 and the battery stack 12 is secured in a state where the battery stack 12 is pressed by the leg 42 of the pressing member 38 (see FIG. 3).

In this case, the shim 28 is inserted into the gap s while the battery stack 12 is pressed by the leg 42 of the pressing member 38. However, the leg piece 42 has a cantilever shape that is hung down from the pressing portion 44. Therefore, when the rigidity of the leg piece 42 is low, the leg piece 42 is bent and deformed, and the gap s may not be secured. Further, in the comparative example, when the shim 28 is inserted, there is a possibility that the shim 28 and the leg 42 of the pressing member 38 may interfere with each other.

In this regard, in the present exemplary embodiment, the gap s for inserting the shim 28 is provided by pressing the battery stack 12 with the pressing rod 46. That is, in the present exemplary embodiment, the leg 42 of the pressing member 38 is not used in providing the gap s.

Therefore, in the present exemplary embodiment, the gap s can be secured without depending on the rigidity of the leg piece 42. In addition, in the present exemplary embodiment, the shim 28 does not interfere with the leg 42 of the pressing member 38 because the leg 42 of the pressing member 38 is not used.

Further, in the present exemplary embodiment, the position of the upper edge 34A of the notch 34 in the height direction is set to be substantially the same as the upper edge 30A of the through hole 30 provided in the side wall 14A of the storage case 14 in a state where the shim 28 is stored in the storage case 14 (see FIG. 8B).

For this reason, in a state where the battery stack 12 and the shim 28 are housed in the housing case 14, the outer surface 20A of the end plate 20 of the battery stack 12 passes through the through hole 30 and the notch 34 of the shim 28 and can be exposed.

That is, the tip of the pressure rod 46 comes into contact with the outer surface 20A of the end plate 20 of the battery stack 12 through the notch 34 formed in the through hole 30 and the shim 28. Therefore, when the pressing force of the pressing rod 46 is released, a concave portion 48 is formed on the outer surface 20A of the end plate 20 at a position where the tip of the pressing rod 46 abuts (see FIG. 8B). Note that the concave portion 48 corresponds to a surface to be pressed.

In this way, for example, when a pressing force equal to or more than a predetermined value set in advance acts on the battery stack 12, the outer surface 20A of the end plate 20 is recessed, so that the recess 48 is formed. As a result, the excess pressure can be absorbed. Thereby, it is possible to prevent the pressing force of the predetermined value or more from acting on the battery stack 12. When the end plate 20 is formed of a material having a higher strength than the pressure bar 46, the concave portion 48 may not be formed.

As illustrated in FIG. 8B, the notch 34 of the shim 28 is formed in a long hole shape from the lower end 28A of the shim 28 toward the upper side, and the width of the notch 34 is set to be slightly larger than the inner diameter of the through hole 30. Further, the position of the upper edge 34A of the notch 34 in the height direction is set to be substantially the same as the upper edge 30A of the through hole 30 provided in the side wall 14A of the storage case 14 in a state where the shim 28 is stored in the storage case 14.

For this reason, as illustrated in FIG. 8A, by disposing the pressing bar 46 in the notch 34 of the shim 28, the shim 28 can avoid interference with the pressing bar 46. In addition, the movement of the shim 28 in the width direction with respect to the storage case 14 is restricted. On the other hand, when the upper edge 34A of the notch 34 of the notch 34 contacts the pressing rod 46, the downward movement of the shim 28 is restricted. That is, in the present exemplary embodiment, the positioning of the shim 28 in the width direction and the downward direction with respect to the storage case 14 is facilitated by the notch 34 abutting the pressing rod 46.

Further, in the present exemplary embodiment, as described above, the position of the upper edge 34A of the notch 34 of the shim 28 in the height direction is set to be substantially the same as the upper edge 30A of the through hole 30 provided in the side wall 14A of the storage case 14 in a state where the shim 28 is stored in the storage case 14. However, the position in the height direction of the upper edge 34A of the notch 34 may be provided above the through hole 30. In this case, the lower end 28A of the shim 28 abuts the bottom surface of the housing 26, whereby the shim 28 is positioned in the vertical direction.

By the way, in the present exemplary embodiment, the pressing rod 46 has a cylindrical shape, and the cutout portion 34 formed in the shim 28 is cut out in a long hole shape from the lower end 28A of the shim 28 toward the upper side. However, the shape of the pressure rod 46 is not limited to a column shape. For example, although not illustrated, the pressure rod 46 may have a prismatic shape. In this case, it is preferable that the shape of the notch is rectangular. That is, the shape of the notch 34 is not limited to a long hole, but can be changed according to the shape of the pressure rod.

In the shim fixing step in the present exemplary embodiment, as illustrated in FIG. 8B, the pressed state of the battery stack 12 by the pressure rods 46 is released by pulling out the pressure rods 46 from the through holes 30 formed in the side wall 14A of the housing case 14. Thus, the shim 28 is fixed at a predetermined position (point I; see FIG. 10).

That is, the battery stack 12 is restored by releasing the pressing force by the pressing rod 46, and the shim 28 is sandwiched between the housing case 14 and the battery stack 12, whereby the shim 28 is fixed.

Thus, in the present exemplary embodiment, by arranging the shim 28 between the battery stack 12 and the housing case 14, the shim 28 allows the battery stack 12 to move along the stacking direction of the battery cells 16 by pressing by the predetermined pressing force F3.

Further, in the present exemplary embodiment, as illustrated in FIG. 6C, the length (L1) of the battery stack 12 in the longitudinal direction is measured, and the length (L2) of the housing portion 26 of the housing case 14 in the longitudinal direction is measured. Further, the shim 28 (see FIG. 7B) is selected by a dimensional difference (L2-L1) between the longitudinal length (L2) of the housing portion 26 of the housing case 14 and the longitudinal length (L1) of the battery stack 12, and the shim 28 is disposed between the battery stack 12 and the housing case 14.

That is, in the present exemplary embodiment, the shim 28 is selected by measuring the dimensions of the storage case 14 and the battery stack 12. Thus, even if a manufacturing error occurs between the housing case 14 and the battery stack 12, the manufacturing error can be absorbed by changing the thickness of the shim 28.

Therefore, in the present exemplary embodiment, the shim 28 is arranged between the battery stack 12 and the housing case 14, and the shim 28 presses the battery stack 12 with the predetermined pressing force F3. Thus, even if a manufacturing error occurs in the battery stack 12 and the housing case 14, the variation in the pressing force F3 can be suppressed by changing the thickness of the shim 28.

Further, in the present exemplary embodiment, as illustrated in FIG. 3, the notch 34 is not formed in the upper portion 28B of the shim 28. For this reason, the upper portion 28B of the shim 28 has higher rigidity than the lower portion 28C of the shim 28 because the notch 34 is not formed.

Therefore, in the present exemplary embodiment, as illustrated in FIG. 8B, with the shim 28 disposed between the battery stack 12 and the storage case 14, the pressing force that presses the battery stack 12 is higher at the upper part 28B of the shim 28 than at the lower part 28C of the shim 28.

Thus, although not illustrated, the battery stack 12 can be made harder to come out of the storage case 14 than in the case where the pressing force on the lower part 28C side of the shim 28 is higher than that on the upper part 28B side of the shim 28. Therefore, in the present exemplary embodiment, in the vehicle on which the battery stack 12 is mounted, the battery stack 12 can be less affected by vibration of the vehicle and the like.

Further, in the present exemplary embodiment, as described above, the pressed state of the battery stack 12 by the pressure rods 46 is released by pulling out the pressure rods 46 from the through holes 30 formed in the side wall 14A of the housing case 14.

Here, as a comparative example, for example, the battery stack 12 is pressed by the leg piece 42 (see FIG. 3) of the pressing member 38, and the shim 28 is inserted into the gap s secured between the housing case 14 and the battery stack 12 (see FIG. 7B). In this case, it is difficult to release the pressurized state of the battery stack 12 by the leg 42 of the pressurizing member 38 while the shim 28 is held at a predetermined position.

On the other hand, in the present exemplary embodiment, as illustrated in FIGS. 7A and 7B, the pressing rod 46 is inserted into the through hole 30 formed in the housing case 14, the gap s is provide between the housing case 14 and the battery stack 12, and a shim 28 is inserted into the gap s. At this time, a cutout portion 34 is formed in the shim 28, and interference with the pressing rod 46 is avoided by the cutout portion 34. That is, the shim 28 does not exist on the movement locus of the pressure rod 46.

For this reason, as described above, in the present exemplary embodiment, it is possible to pull out the pressure rod 46 from the through hole 30 while holding the shim 28 in a predetermined position, and the pressure state with respect to the battery stack 12 can be easily released.

Although not illustrated, a guard made of a resin having lubricity is provided on the outer peripheral surface 46A of the pressure rod 46 in order to reduce sliding resistance with the notch 34. With this guard, damage to the shim 28 due to sliding of the pressure rod 46 can be suppressed. However, the guard is not always necessary.

Further, in the through-hole closing step in the present exemplary embodiment, as illustrated in FIGS. 4 and 9, the through-hole 30 formed in the side wall portion 14A of the housing case 14 is closed. For example, a resin member is filled in the through hole 30. Thus, the closing portion 32 is provided on the side wall portion 14A of the housing case 14. In this manner, the waterproofing property of the storage case 14 can be ensured by closing the through-hole 30 with the closing portion 32.

As above, an example of the exemplary embodiment of the present disclosure has been described, but the present disclosure can be variously modified and implemented without departing from the gist thereof. Obviously the scope of rights of the present disclosure is not limited to the above exemplary embodiments.

What is claimed is:

1. A battery module, comprising:
   a housing case having a box-shaped and an open top:
   a battery stack including a stacked battery body in which a plurality of battery cells are stacked along a horizontal direction, the battery stack being housed in the housing case;
   a spacer member disposed between the battery stack and the housing case in a state in which the battery stack is pressed in a stacking direction of the plurality of battery cells, the spacer member being formed with an elongated cutout portion that extends from a lower end of the spacer member towards an upper side of the spacer member;
   an end plate provided at each end the stacking direction of the plurality of battery cells of the battery stack; and
   a groove portion formed at an outer surface of each of the end plates and extending in a vertical direction from an upper end of each of the end plates,
   wherein a depth of the groove portion is set such that the outer surface of each of the end plates protrudes further towards a side wall of the housing case than an inner surface of a first pressing member, in a state in which the first pressing member configured to press the battery stack in the stacking direction of the plurality of battery cells is inserted into the groove portion member.

2. The battery module according to claim 1, wherein the outer surface of each of the end plates includes a surface to be pressed, the surface to be pressed configured to be exposed through the elongated cutout portion of the spacer member and deforms when each of the end plates is pressed in the stacking direction of the plurality of battery cells.

3. The battery module according to claim 2, wherein a closing member, which closes a through hole formed opposite to the surface to be pressed, is provided at the side wall of the housing case.

4. A battery module manufacturing method for manufacturing a battery module according to claim 3, the method comprising:
   housing the battery stack step by inserting a first pressing member into the groove portion, pressing the battery stack in the stacking direction of the plurality of battery cells, and housing the battery stack in a housing case;
   pressing a battery stack by inserting a second pressing member into the through hole that is formed at a side wall of the housing case, pressing the battery stack in the stacking direction of the plurality of battery cells by the second pressing member in a state in which the first pressing member has been removed from each of the end plates, and providing a gap between the housing case and the battery stack;
   inserting a spacer member into the gap; and fixing the spacer member by removing the second pressing member from the side wall of the housing case and fixing the spacer member.

5. The battery module manufacturing method according to claim 4, further comprising closing the through hole in which the through hole is closed after fixing the spacer member.

6. A battery module manufacturing method for manufacturing a battery module according to claim 1, the method comprising:
   a battery stack housing step in which a first pressing member, which is configured to be inserted into a groove portion formed on an outer surface of each of the end plates provided at each end of a stacking direction of a plurality of battery cells of a battery stack, is inserted into the groove portion, the battery stack is pressed in the stacking direction of the plurality of battery cells, and the battery stack is housed in a housing case;
   a battery stack pressing step in which a second pressing member, which is configured to press the battery stack in the stacking direction of the plurality of battery cells, is inserted into a through hole that is formed at a side wall of the housing case, the battery stack is pressed in the stacking direction of the plurality of battery cells by the second pressing member in a state in which the first pressing member has been removed from each of the end plates, and a gap is provided between the housing case and the battery stack;
   a spacer member insertion step in which a spacer member is inserted into the gap; and
   a spacer member fixing step in which the second pressing member is removed from the side wall of the housing case and the spacer member is fixed.

7. The battery module manufacturing method according to claim 6, wherein a through hole closing step, in which the through hole is closed, is provided after the spacer member fixing step.

* * * * *